United States Patent [19]
Ang

[11] Patent Number: 6,126,974
[45] Date of Patent: Oct. 3, 2000

[54] ANTI-CAKING ANTI-MYCOTIC FOOD INGREDIENT AND PROCESS FOR PRODUCING THE SAME

[75] Inventor: Jit F. Ang, Chesterfield, Mo.

[73] Assignee: Protein X Technologies Int'l Inc., St. Louis, Mo.

[21] Appl. No.: 09/039,310

[22] Filed: Mar. 13, 1998

[51] Int. Cl.$^7$ ...................................................... A01N 25/26
[52] U.S. Cl. ........................... 426/98; 424/410; 424/417; 426/292; 426/335; 426/532; 426/654
[58] Field of Search ................................ 426/89, 654, 98, 426/103, 273, 285, 289, 290, 294, 302, 310, 321, 335, 532, 582, 658, 292; 424/410, 417, 405

[56] References Cited

U.S. PATENT DOCUMENTS

| | | | |
|---|---|---|---|
| 3,836,683 | 9/1974 | Hoos et al. | 426/582 |
| 3,985,904 | 10/1976 | Bernotavicz | 426/332 |
| 4,146,652 | 3/1979 | Kahn et al. | 426/564 |
| 4,416,904 | 11/1983 | Shannon | 426/19 |
| 4,533,560 | 8/1985 | Procunier | 426/578 |
| 4,557,938 | 12/1985 | Sander et al. | 426/453 |
| 4,696,762 | 9/1987 | Sander et al. | 252/311 |
| 5,204,029 | 4/1993 | Morgan et al. | 264/4.4 |
| 5,391,382 | 2/1995 | Chappell | 426/36 |
| 5,532,010 | 7/1996 | Spanier et al. | 426/94 |
| 5,626,893 | 5/1997 | Reddy | 426/36 |

*Primary Examiner*—Keith D. Hendricks
*Attorney, Agent, or Firm*—Richard B. Taylor

[57] ABSTRACT

The present invention relates to a food ingredient composition having anti-mycotic and anti-caking functionality, and a process for producing the same. The food ingredient composition contains a particulate anti-caking material at least partially encapsulated with an encapsulating agent, and a direct action anti-mycotic material coated on particles of the encapsulated anti-caking material. The present invention is also directed to food material compositions including the food ingredient composition.

29 Claims, 1 Drawing Sheet

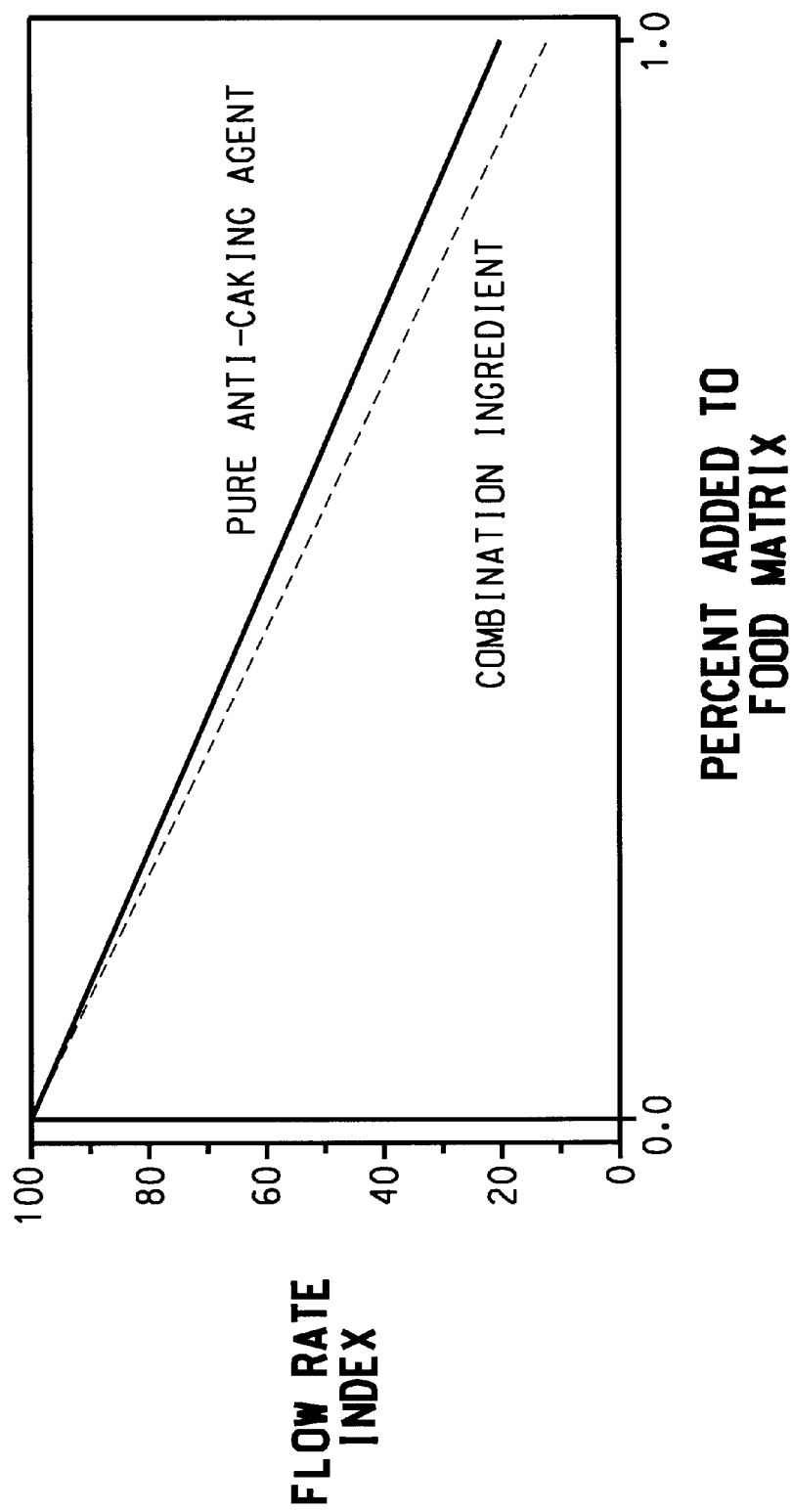

6,126,974

ANTI-CAKING ANTI-MYCOTIC FOOD INGREDIENT AND PROCESS FOR PRODUCING THE SAME

FIELD OF THE INVENTION

The present invention relates to food ingredient compositions, foods containing the same, and processes for producing such food ingredient compositions. In particular, the present invention relates to a food ingredient composition having both anti-caking and anti-mycotic activities, to foods containing the same, and to processes for producing such compositions.

BACKGROUND OF THE INVENTION

The quality of certain foods is enhanced by the addition of food ingredients, such as anti-caking materials and anti-mycotic materials, which modify the functional characteristics of such foods or prolong the shelf life of the foods. Divided, shredded, and grated foods are commonly treated with an anti-caking material food ingredient to enhance the flow characteristics of the divided food material and to prevent the food material from clumping together. Anti-mycotic materials are commonly added to foods susceptible to mold, yeast, and fungus to inhibit growth of molds, yeast, and fungi and extend the shelf-life of the foods.

Anti-caking materials are typically food grade powdered or particulate materials such as celluloses, silicates and the like, which are dispersed in a divided food material by being mixed with the food material. The powdery anti-caking material enhances the flow characteristics of the food material in which it is dispersed. Anti-caking materials are also typically porous and absorbent to absorb moisture in the food, thereby reducing moisture-induced clumping of the divided food material.

Anti-mycotic materials are materials which directly or indirectly inhibit mold, yeast, and fungus growth. Direct action anti-mycotic materials are materials which inhibit the growth of a mold, yeast, or a fungus upon direct contact with the mold, yeast, or fungus. Direct action anti-mycotic materials are commonly applied to food materials by forming a suspension of the anti-mycotic in a liquid medium and applying the liquid suspension to a food material. Indirect action anti-mycotic materials are materials such as enzyme/carbohydrate mixtures or combinations of chemicals which react in combination with oxygen in a sealed package to scavenge and deplete oxygen in the package containing the anti-mycotic mixture, thereby inhibiting the growth of oxygen dependent molds, yeast, and fungi.

Divided foods needing improved flow characteristics and inhibition of mold, yeast, or fungus growth are enhanced by the addition of both anti-caking material and anti-mycotic material food ingredients. For example, anti-caking material and anti-mycotic material food ingredients are commonly added to grated, shredded, diced, crumbled, or sliced cheeses and to fermented meat products such as sausages or pepperoni in commercial processes for forming such foods.

Anti-caking materials and anti-mycotic materials are typically added separately to a food material. The anti-mycotic material may be added to a food material in which the anti-caking material is already dispersed, or the anti-caking material may be added to a food material which has been treated with an anti-mycotic material. It is desirable, however, to apply a material having combined anti-mycotic and anti-caking properties to a food material to provide uniform dispersal of the anti-mycotic and anti-caking activities throughout the food material, and to reduce the amount of processing of the food material.

Food ingredients having combined anti-caking and anti-mycotic activities are known in the art, but are either ineffective to deliver the desired anti-caking and anti-mycotic properties or have significant drawbacks. Combinations of anti-caking materials with indirect action anti-mycotic materials have been used, and are effective to provide anti-caking and anti-mycotic properties in a sealed package. Indirect action anti-mycotic materials, however, are only effective so long as the package is sealed, and lose effectiveness when the package is opened, or if the seals on the package are not intact, and oxygen is introduced into the package. Packaging of food materials containing an indirect action anti-mycotic material is also expensive since a heavy packaging material is needed to prevent gas diffusion through the package and controlled atmosphere flushing of the packages is often necessary.

A dry anti-caking material can be blended with a dry direct action anti-mycotic material to provide a food ingredient with both anti-caking and anti-mycotic activities. Dry blends of anti-caking material and direct action anti-mycotic material, however, suffer drawbacks which effectively preclude their use as a food ingredient. First, dry blends having effective anti-mycotic activity cannot be formed without exceeding the maximum level of anti-mycotics permissible by food regulations. For safety purposes, food regulations permit only minute quantities of direct action anti-mycotic materials to be added to foods. In order to achieve a uniform distribution of a dry direct action anti-mycotic in the dry anti-caking material, a substantial excess of the dry anti-mycotic over the maximum level of anti-mycotics allowed by regulation must be dispersed in the mixture. Second, dry blends of anti-caking materials and direct action anti-mycotic materials have irregular anti-mycotic function, resulting in foods susceptible to patches of molds, yeast, or fungi, since simple blends tend not to be homogenous in composition. Third, food ingredients containing dry blends of anti-caking materials and anti-mycotic materials are quite dusty, resulting in significant loss of the food ingredient in the process of applying the food ingredient to a food.

Food ingredients containing combined anti-mycotic and anti-caking materials which are formed by direct application of a liquid medium containing a direct action anti-mycotic to an anti-caking material are ineffective as anti-mycotics. The porous and absorbent nature of anti-caking materials causes an anti-caking material to absorb and trap liquid anti-mycotic materials or anti-mycotic materials contained in a liquid suspension within the interior of the anti-caking material. This renders the resulting combination ineffective in treating mold, yeast, and fungal growths when the anti-mycotic is added in concentrations within food safety regulation limits since the direct action anti-mycotic is unavailable to contact and eliminate mold, yeast, and fungal growths in a food material.

SUMMARY OF THE INVENTION

The present invention was developed in view of the observation that a food ingredient having combined anti-caking activity and direct action anti-mycotic activity at acceptable anti-mycotic concentrations is desirable since such an ingredient would provide improved anti-mycotic activity over other known combination ingredients, while making the production of food materials containing anti-caking and anti-mycotic materials simpler and less expensive than application of separate anti-caking and anti-mycotic ingredients.

In one aspect, the present invention is a food ingredient composition having anti-mycotic and anti-caking properties.

The food ingredient contains a particulate anti-caking material and an encapsulating agent which at least partially encapsulates particles of the anti-caking material. A direct action anti-mycotic material is coated on particles of the encapsulated anti-caking material, where the anti-mycotic material is on or near the surface of the particles of encapsulated anti-caking material.

In another aspect, the present invention is a process for forming a food ingredient having anti-caking and anti-mycotic properties. A particulate anti-caking material is provided. The anti-caking material is treated with an encapsulating agent to at least partially encapsulate the anti-caking material with the encapsulating agent. The encapsulated anti-caking material is treated with a direct action anti-mycotic material so that a substantial portion of the anti-mycotic material is located on the surface of the particles of the encapsulated anti-caking material.

In yet another aspect, the present invention is a process for forming a food ingredient having anti-caking and anti-mycotic properties in which a particulate anti-caking material is provided, and is treated with an encapsulating agent containing a direct action anti-mycotic material so that a substantial portion of the anti-mycotic material is located on the surface of the particles of anti-caking material.

In still another aspect, the present invention is a food material composition. The food material composition contains a food material and a functional ingredient. The functional ingredient is dispersed through the food material, and is comprised of a particulate anti-caking material at least partially coated with an encapsulating agent having a direct action anti-mycotic material dispersed on or in the encapsulating agent, where the anti-mycotic material is located on the surface of the particles of the anti-caking agent.

In a still further aspect, the present invention is a process of treating a food material with a functional ingredient having anti-caking and direct action anti-mycotic properties. A food material is provided, and a functional ingredient is provided, where the functional ingredient contains an anti-caking material having a direct action anti-mycotic material dispersed on the surfaces of particles of the anti-caking material. The functional ingredient is then dispersed in the food material.

BRIEF DESCRIPTION OF THE DRAWINGS

FIG. 1 is a graph showing the flow rate index of the food ingredient composition of the present invention relative to a pure anti-caking agent.

DETAILED DESCRIPTION OF THE INVENTION

The food ingredient composition of this invention includes a particulate anti-caking material, an encapsulating agent which at least partially encapsulates particles of the anti-caking material, and a direct action anti-mycotic material which is coated on particles of the encapsulated anti-caking material. The composition provides anti-caking and anti-mycotic functionality to a divided food material in which the composition is dispersed, and is structured and arranged to generate little dust upon handling relative to conventional anti-caking and anti-mycotic materials.

The anti-caking material is a material which is effective for reducing caking and enhancing the flowability of a divided food material into which the anti-caking material is dispersed. The anti-caking material should be able to absorb and retain water, fat, and other liquids on the surface of a food material in which the anti-caking agent is dispersed. The anti-caking material may be selected from any conventional material utilized as a food ingredient for anti-caking purposes. Commonly used anti-caking materials which may be utilized in the present invention include food grade: celluloses, including powdered cellulose and microcrystalline cellulose; silicates; starches; clays, including bentonite and montmorillite; minerals; flours, including rice flour, wheat flour, corn flour, and soy flour; fibers; polysaccharides; carbohydrates; protein compounds including soy protein and casein; and combinations thereof. In a preferred embodiment a cellulose is used as the anti-caking agent, and most preferably powdered cellulose is utilized.

The anti-caking material may be present in the food ingredient composition from about 1% to about 99% of the composition, by weight. Preferably, the anti-caking material is present in the composition from about 50% to about 99% by weight, and more preferably from about 70% to about 95% by weight.

The encapsulating agent serves as a barrier on the surface of the anti-caking material to prevent the absorption of the direct action anti-mycotic material from the surface of the anti-caking material into the interior of the anti-caking agent. The encapsulating agent should also serve as an adhesive material to trap and enhance the adhesion of the anti-mycotic material to the surface of the anti-caking material.

The encapsulating agent is a food grade agent capable of coating, or encapsulating, at least a portion of particles of the anti-caking material. The encapsulating agent should be a liquid material relatively more viscous or dense than water so that the encapsulating agent coats the anti-caking material without being excessively absorbed by the anti-caking material. The encapsulating agent may be selected from common, commercially available, food grade materials. Preferably the encapsulating agent is selected from the following group of materials: oils, including lecithin, annato oil (soluble), and vegetable oils such as soy oil, peanut oil, corn oil, canola, cottonseed oil, and sunflower seed oil; fats; emulsifiers; sugar alcohols; proteins; polyols; carbohydrate solutions; hydrocolloids; and mixtures of the above materials. In a most preferred embodiment the encapsulating agent is lecithin.

The encapsulating agent may be present in the food ingredient composition from about 0.05% to about 30% of the composition, by weight. Preferably, the encapsulating agent is present in the composition from about 0.07% to about 20% by weight, and more preferably from about 0.1% to about 10% by weight.

The anti-mycotic material is a food grade material which is effective for inhibiting the growth of molds, fungi, and yeasts upon direct contact with such molds, fungi, or yeasts. The anti-mycotic material should be a material which can be trapped on or near the surface of particles of the anti-caking material by the encapsulating agent so that the anti-mycotic material is available to directly contact molds, fungi, and yeasts in a food material to inhibit their growth. The anti-mycotic material may be selected from commercially available direct action anti-mycotics. Preferably the anti-mycotic material is selected from natamycin (also known as pimaricin), lucensomycin, tetramycin, tetrin A, tetrin B, nystatin, amphtericin B, candicidin, trichomycin, and mixtures thereof. In a most preferred embodiment, the anti-mycotic material is natamycin. The anti-mycotic material may also include other non-anti-mycotic ingredients such as lactose and silicon dioxide, which are included in commercially available anti-mycotics as processing aids.

The anti-mycotic material may be present in the food ingredient composition from about 0.0001% to about 10% of the composition, by weight. Preferably, the anti-mycotic material is present in the composition from about 0.001% to about 5% by weight, and more preferably from about 0.01% to about 1% by weight.

In one embodiment, the food ingredient composition of the present invention is prepared by providing a particulate anti-caking material, treating the anti-caking material with an encapsulating agent to at least partially encapsulate the anti-caking material with the encapsulating agent, and treating the encapsulated anti-caking material with a direct action anti-mycotic material so that a substantial portion of the anti-mycotic material is located on the surface of particles of the encapsulated anti-caking material.

An anti-caking material is provided by selecting an appropriate food grade anti-caking material for use in the food ingredient composition, and selecting an appropriate amount of the anti-caking material. Preferred anti-caking materials for use in the composition are those listed above. Preferred amounts of the anti-caking material are from about 1% to about 99% by weight of the food ingredient composition, more preferably from about 50% to about 99% by weight of the composition, and most preferably from about 70% to about 95% by weight of the composition.

The anti-caking material is treated with the encapsulating agent by at least partially coating the anti-caking material with the encapsulating agent. The encapsulating agent is selected from a food grade material, and preferred encapsulating agents are those listed above. The anti-caking material should be treated with sufficient encapsulating agent to at least partially coat the anti-caking material, and preferably the encapsulating agent is present in the food ingredient composition from about 0.05% to about 30% of the composition, by weight, more preferably, from about 0.07% to about 20% by weight of the composition, and most preferably from about 0.1% to about 10% by weight of the composition.

The anti-caking material is coated with the encapsulating agent by being mixed with the encapsulating agent. The encapsulating agent may be mixed with the anti-caking material by any process for mixing a liquid with a particulate solid material. For example, the encapsulating agent may be mixed with the anti-caking material by adding the encapsulating agent to the anti-caking material and agitating the materials together.

In a preferred embodiment, the encapsulating agent and the anti-caking material are mixed by spraying the encapsulating agent onto the anti-caking material. Prior to spraying the encapsulating agent onto the anti-caking material the encapsulating agent may be heated, if necessary, to reduce the viscosity of the encapsulating agent or to solubilize insoluble materials in the encapsulating agent to enable the encapsulating agent to be sprayed easily onto the anti-caking material.

In a most preferred embodiment, the encapsulating agent is atomized as it is sprayed onto the anti-caking material. Atomization of the encapsulating agent is preferred since the atomized encapsulating agent uniformly coats the anti-caking material. The encapsulating agent may be atomized with conventional atomization equipment.

It is also preferred that the anti-caking material be agitated while the encapsulating agent is being sprayed onto the anti-caking material. Agitation of the anti-caking material during application of the encapsulating agent also helps assure that the encapsulating agent is uniformly applied to the anti-caking material. The anti-caking material may be agitated by conventional types of blending and mixing equipment. A ribbon-type blender is particularly preferred for agitating the anti-caking material during application of the encapsulating agent.

The encapsulated anti-caking material is then treated with the anti-mycotic material to produce the food ingredient composition of the present invention. The anti-mycotic material is selected from a food grade material, and preferred anti-mycotic materials are those listed above. The encapsulated anti-caking material should be treated with sufficient anti-mycotic material to enable the composition to provide effective anti-mycotic activity, but should not be treated with excessive amounts of anti-mycotic material so the food ingredient will not exceed the maximum concentration of anti-mycotics permissible under food safety regulations when the food ingredient is added to a food material. Preferably the anti-mycotic is present in the food ingredient composition from about 0.0001% to about 10% of the composition, by weight, more preferably, from about 0.001% to about 5% by weight of the composition, and most preferably from about 0.01% to about 1% by weight of the composition.

The encapsulated anti-caking material is treated with the anti-mycotic material by mixing the encapsulated anti-caking material with the anti-mycotic material. Preferably, mixing the anti-mycotic material with the encapsulated anti-caking material causes the anti-mycotic material to be bound to the surface of the encapsulated anti-caking material, thereby enabling the composition to inhibit mold, fungus, and yeast growth upon direct contact with molds, fungi, or yeasts.

The encapsulated anti-caking material may be mixed with the anti-mycotic material by agitating the anti-mycotic material with the encapsulated anti-caking material. For example, if the anti-mycotic material is solid particulate material, the anti-mycotic material may be dusted on the encapsulated anti-caking material while the encapsulated anti-caking material is agitated.

In a preferred embodiment, the anti-mycotic material is contained in a liquid medium, and the anti-mycotic material is mixed with the encapsulated anti-caking material by spraying the liquid medium containing the anti-mycotic material onto the encapsulated anti-caking material. Solid anti-mycotic materials may be added to a liquid to form a sprayable solution or a suspension of the anti-mycotic material. The liquid to which a solid anti-mycotic material may be added may be water or any food grade liquid material suitable for spraying. Preferably the liquid is water, or an oil such as lecithin, annato oil (soluble), or suitable vegetable oils. If the anti-mycotic material is not soluble in the liquid, for example natamcyin forms a suspension in water, it is preferred to agitate the suspension while spraying the suspension onto the encapsulated anti-caking material to assure that the anti-mycotic material is evenly distributed onto the anti-caking material.

In a most preferred embodiment, the liquid medium containing the anti-mycotic material is atomized as it is sprayed onto the encapsulated anti-caking material. Atomization of the liquid medium containing the anti-mycotic material is preferred since the atomized liquid medium uniformly distributes the anti-mycotic material onto the encapsulated anti-caking material. The liquid medium containing the anti-mycotic material may be atomized with conventional atomization equipment.

It is also preferred that the encapsulated anti-caking material be agitated while the liquid medium containing the anti-mycotic material is sprayed onto the encapsulated anti-caking material. Agitation of the encapsulated anti-caking material during application of the anti-mycotic material helps ensure that the anti-mycotic agent is uniformly applied to the encapsulated anti-caking material. The encapsulated anti-caking agent may be agitated by conventional types of blending and mixing equipment during application of the anti-mycotic material. A ribbon-type blender is particularly preferred for agitating the encapsulated anti-caking material.

The encapsulated anti-caking material treated with the anti-mycotic material is recovered after being treated with the anti-mycotic material. The recovered material is the food ingredient composition of the present invention.

If desired, the food composition may be further processed before being added to a food material. The food ingredient composition may be dried according to conventional processes after combining the anti-mycotic material, encapsulating agent, and anti-caking material. Conventional flavors, seasonings, and spices can be added to the food ingredient composition to enhance to desirability of a food material to which the food ingredient composition will be added. Food coloring agents may also be added to the food ingredient composition to color the food ingredient composition.

In another embodiment, a food ingredient composition of the present invention can be prepared by providing a particulate anti-caking material, and treating the particulate anti-caking material with an encapsulating agent containing a direct action anti-mycotic material so that a substantial portion of the anti-mycotic material is located on the surface of the anti-caking material. The process is conducted as disclosed above, except that the anti-mycotic agent is blended in the encapsulating agent, which serves as a liquid medium for dispersing the anti-mycotic agent onto the anti-caking material. The anti-caking material is treated with the encapsulating agent containing the anti-mycotic material to encapsulate the anti-caking material with the encapsulating agent while simultaneously applying the anti-mycotic material on the surface of particles of the anti-caking material.

Preferably, the encapsulating agent containing the anti-mycotic material is sprayed onto the anti-caking material, and most preferably is atomized as it is sprayed onto the anti-caking material. It is preferred that the anti-mycotic agent be agitated in the encapsulating agent as the combined material is sprayed onto the anti-caking material, and it is also preferred that the anti-caking material be agitated while the combined encapsulating agent and anti-mycotic material is applied.

The present invention is also directed to a food material composition containing a food and a functional ingredient which is the food ingredient composition described above. The food material composition has substantial anti-mycotic activity over an extended period of time in oxygenated and non-oxygenated environments, and preferably has substantial anti-mycotic activity in a controlled oxygenated environment for a period of up to six months, and more preferably for a period of up to twelve months. A "controlled" oxygenated environment, as used herein, is an environment which contains 5% or less oxygen. The food material composition can be packaged and stored using conventional packaging and storing materials and equipment.

The food portion of the food material composition is a divided cheese material, a fermented meat material such as sausage or pepperoni, or any other food which is a divided material subject to caking and susceptible to mold, yeast, or fungal growth. Hereafter, the food portion of the food material composition will be referred to as a divided cheese material since the present invention is especially applicable to divided cheese materials, however, the food is intended to include fermented meat materials and any food which is a divided material subject to caking and susceptible to mold, yeast, or fungal growth.

The divided cheese material may be formed from any type of cheese. It is especially preferred that the divided cheese material be selected from the following types of cheeses: cheddar, mozzarella, parmesan, romano, provolone, american cheese, imitation cheeses, cheese analogs, and mixtures of the above cheeses. The cheeses may be divided in any manner known to divide cheeses. The divided cheeses include grated, shredded, diced, crumbled, and sliced cheeses.

The divided cheese material forms a substantial portion of the food material composition since the functional ingredient is included in the food material composition to enhance the food portion of the food material composition. Preferably, the divided cheese is present in the food material composition from about 50% to about 99.9% by weight of the food material composition, and more preferably from about 95% to about 99.5% by weight of the composition.

The functional ingredient of the food material is the food ingredient composition described above which is dispersed in the divided cheese material. Specifically, the functional ingredient contains a particulate anti-caking material having a direct action anti-mycotic material dispersed on the surfaces of particles of the anti-caking material. The anti-caking and anti-mycotic materials are selected from the anti-caking materials and anti-mycotic materials as described above, and are present in the functional ingredient in the amounts described above with respect to the food ingredient composition.

Preferably, the functional ingredient includes an encapsulating agent which partially encapsulates the anti-caking material, and on which the anti-mycotic material is located. The encapsulating agent is selected from the encapsulating agents listed above with respect to the food ingredient composition, and is present in the functional ingredient in the amount described above with respect to the food ingredient composition.

The functional ingredient is present in the food material composition in an amount effective to provide anti-caking and anti-mycotic activity to the food material composition. Preferably the functional ingredient is present in the food material composition from about 0.1% to about 50% of the composition by weight, and more preferably from about 0.5% to about 2% of the composition by weight.

The food material composition of the present invention is prepared by providing a divided cheese material, providing a functional ingredient containing a particulate anti-caking material having a direct action anti-mycotic material dispersed on the surfaces of particles of the anti-caking material, and dispersing the functional ingredient in the divided cheese material.

A divided cheese material is provided by selecting a divided cheese material, as described above, and selecting the amount of divided cheese material to be used in the food material composition within the ranges described above. A functional ingredient is provided by forming the food ingredient composition as described above, including the specified anti-caking materials, anti-mycotic materials, and encapsulating agents in the amounts specified above.

The functional ingredient may be dispersed in the divided cheese material by any method for mixing solid particulate materials. In a preferred embodiment, the functional ingredient is dispersed in the divided cheese material by blending the materials in a blender such as a ribbon-type blender. The food material composition prepared by dispersing the functional ingredient in the divided cheese material can be packaged and stored using conventional packaging and storing processes and equipment.

The following non-limiting examples illustrate the present invention.

EXAMPLE 1

In a first experiment, a food ingredient composition of the present invention is formed. The following ingredients are provided in following amounts, relative to the total weight of the ingredients.

| Ingredient | Percent, by weight (of total weight of ingredients) |
| --- | --- |
| Powdered cellulose (anti-caking material) | 96.24 |
| Lecithin (encapsulating agent) | 1.00 |
| Natamycin (anti-mycotic material) | 0.06 |
| Lactose (processing aid in anti-mycotic material) | 0.06 |
| Water (liquid medium for dispersing anti-mycotic) | 2.64 |

All of the cellulose is loaded into a ribbon-type blender and is blended for a few minutes. An amount of lecithin in excess of the amount of lecithin to be applied as an encapsulating agent is heated to reduce the viscosity of the lecithin for ease of processing. The required amount of lecithin is then atomized into the blender containing the cellulose with the blender running. After the required amount of lecithin is added, the blender is allowed to run for a few minutes to thoroughly mix the lecithin and the cellulose. Separately the natamycin/lactose material is suspended in the water and the water containing the natamycin/lactose is agitated to prevent sedimentation of the natamycin. The aqueous suspension of natamycin/lactose is then atomized into the blender containing the cellulose and lecithin with the blender running. The aqueous suspension of natamycin/lactose is agitated continuously during atomization to prevent sedimentation of the natamycin. After all of the aqueous natamycin/lactose material is atomized into the blender, the blending is continued for a few minutes to ensure that the combined ingredients are homogeneously mixed. The food ingredient composition is recovered from the blender.

EXAMPLE 2

In a second experiment, a food ingredient composition of the present invention is formed, where the anti-mycotic material is suspended in a soy oil instead of water. The following ingredients are provided in following amounts, relative to the total weight of the ingredients.

| Ingredient | Percent, by weight (of total weight of ingredients) |
| --- | --- |
| Powdered cellulose (anti-caking material) | 96.88 |
| Lecithin (encapsulating agent) | 1.00 |
| Natamycin (anti-mycotic material) | 0.06 |

-continued

| Ingredient | Percent, by weight (of total weight of ingredients) |
| --- | --- |
| Lactose (processing aid in anti-mycotic material) | 0.06 |
| Soy oil (liquid medium for dispersing anti-mycotic) | 2.00 |

All of the cellulose is loaded into a ribbon-type blender and is blended for a few minutes. An amount of lecithin in excess of the amount of lecithin to be applied as an encapsulating agent is heated to reduce the viscosity of the lecithin for ease of processing. The required amount of lecithin is then atomized into the blender containing the cellulose with the blender running. After the required amount of lecithin is added, the blender is allowed to run for a few minutes to thoroughly mix the lecithin and the cellulose. Separately the natamycin/lactose material is suspended in the soy oil and the soy oil containing the natamycin/lactose is agitated to prevent sedimentation of the natamycin. The soy oil suspension of natamycin/lactose is then atomized into the blender containing the cellulose and lecithin with the blender running. The soy oil suspension of natamycin/lactose is agitated continuously during atomization to prevent sedimentation of the natamycin. After all of the soy oil natamycin/lactose material is atomized into the blender, the blending is continued for a few minutes to ensure that the combined ingredients are homogeneously mixed. The food ingredient composition is recovered from the blender.

EXAMPLE 3

In a third experiment, a food ingredient composition of the present invention is formed, where the anti-mycotic material is suspended in the encapsulating agent, soy oil. The following ingredients are provided in following amounts, relative to the total weight of the ingredients.

| Ingredient | Percent, by weight (of total weight of ingredients) |
| --- | --- |
| Powdered cellulose (anti-caking material) | 96.24 |
| Natamycin (anti-mycotic material) | 0.06 |
| Lactose (processing aid in anti-mycotic material) | 0.06 |
| Soy oil (encapsulating agent) | 3.00 |

All of the cellulose is loaded into a ribbon-type blender and is blended for a few minutes. Separately the natamycin/lactose material is suspended in the soy oil and the soy oil containing the natamycin/lactose is agitated to prevent sedimentation of the natamycin. The soy oil suspension of natamycin/lactose is then atomized into the blender containing the cellulose with the blender running. The soy oil suspension of natamycin/lactose is agitated continuously during atomization to prevent sedimentation of the natamycin. After all of the soy oil natamycin/lactose material is atomized into the blender, the blending is continued for a few minutes to ensure that the combined ingredients are homogeneously mixed. The food ingredient composition is recovered from the blender.

EXAMPLE 4

In a fourth experiment, the anti-caking efficacy in a food material of the food ingredient composition prepared in accordance with Example 1 above is measured relative to a pure anti-caking material.

Three samples of shredded mozzarella cheese materials are prepared. The first sample is a control sample containing only shredded mozzarella cheese. The second sample contains 99% shredded mozzarella cheese with 1% powdered cellulose anti-caking material dispersed throughout the cheese (a typical amount of anti-caking material added to shredded cheese). The third sample contains 99% shredded mozzarella cheese with 1% of the food ingredient composition prepared in accordance with Example 1 dispersed throughout the cheese.

Each sample is placed in a funnel (with the bottom spout covered) located on a laboratory stand having a vibrator sitting on the base plate of the laboratory stand. The funnel has a bottom spout diameter of one inch (1.0"). The vibrator is turned on and the bottom spout is simultaneously uncovered to allow the sample to flow out the bottom spout of the funnel. The time required for the entire sample to flow out of the funnel is recorded. A flow index is calculated according to the following formula: Flow Index=[Time required for entire sample to flow out of funnel/Time required for entire control sample to flow out of funnel]*100. A graph of the flow index of the cellulose and food ingredient composition samples is shown in FIG. 1.

As shown in the graph, the food ingredient composition of the present invention is equally effective in providing an anti-caking effect as a pure anti-caking material.

EXAMPLE 5

In a fifth experiment, the anti-mycotic efficacy in a food material of the food ingredient composition prepared in accordance with Example 1 above is measured.

Three samples of shredded cheddar cheese are prepared. The first sample is a control sample, which contains no anti-mycotic material. The second sample contains 99% shredded cheddar cheese with 1% of the food ingredient composition prepared in accordance with Example 1 dispersed throughout the cheese. The third sample contains 98% shredded cheddar cheese with 2% of the food ingredient composition prepared in accordance with Example 1 dispersed throughout the cheese. The samples are packaged in conventional cheese packaging material, and are stored under refrigerated conditions (40° F.–45° F.).

The samples are analyzed by standard laboratory agar plating for yeast and mold concentrations at the time the samples are packaged, 15 days after packaging, and 30 days after packaging. The results are shown in Table 1 below.

TABLE 1

| Storage Period | Control | 1% composition | 2% composition |
|---|---|---|---|
| Day 0 | | | |
| Yeast (cfu/g) | $1.3 \times 10^2$ | $3.0 \times 10^2$ | $2.2 \times 10^2$ |
| Mold (cfu/g) | Less than 10 | $1.0 \times 10^1$ | $1.5 \times 10^1$ |
| Day 15 | | | |
| Yeast (cfu.g) | $4.4 \times 10^5$ | $1.2 \times 10^2$ | $2.6 \times 10^2$ |
| Mold (cfu/g) | Less than 10 | Less than 10 | Less than 10 |
| Day 30 | | | |
| Yeast (cfu/g) | $8.0 \times 10^7$ | $2.2 \times 10^2$ | $1.7 \times 10^2$ |
| Mold (cfu/g) | $4.4 \times 10^5$ | Less than 10 | Less than 10 |

As shown in Table 1, the food ingredient composition has significant anti-mycotic effect at concentrations of 1% and 2% of a food material, by weight.

EXAMPLE 6

In a sixth experiment, the amount of dust generated by a food ingredient composition formed in accordance with Example 1 is measured relative to a conventional cellulose anti-caking material.

A sample of the food material composition and a sample of the cellulose anti-caking material are weighed. The samples are individually placed in a funnel having the bottom spout covered, where the funnel is mounted on a laboratory stand two-and-one-half feet (2.5') above the base plate of the stand. A vibrator is located on the base plate of the stand, and a four-and-one-half inch diameter (4.5") sample collection plate is also located on the base plate of the stand directly below the bottom spout of the funnel. The vibrator is turned on and the bottom spout of the funnel is uncovered to allow the sample to be discharged from the funnel into the collection plate. After the entire sample is discharged, the amount of sample collected in the collection plate is weighed, and a calculation is made expressing the collected weight as a percentage of the original sample weight. Dustier samples have a lower collected weight percentage since less material is collected in the sample collection plate. The results are shown in Table 2 below.

TABLE 2

| Sample | Percent sample collected in collection plate |
|---|---|
| Cellulose anti-caking material | 82 |
| Food ingredient composition | 96 |

As shown in Table 2, the food ingredient composition generates less dust than a conventional cellulose anti-caking material.

EXAMPLE 7

In a seventh experiment, the anti-mycotic efficacy of a food ingredient composition formed in accordance with the present invention is measured over an extended period of time.

A food ingredient composition is formed in the manner set forth in Example 1, except that the ingredients are included in the following percentages, by weight of the total ingredient composition.

| Ingredient | Percent, by weight (of total weight of ingredients) |
|---|---|
| Powdered cellulose (anti-caking material) | 96.24 |
| Lecithin (encapsulating agent) | 1.00 |
| Natamycin (anti-mycotic material) | 0.09 |
| Lactose (processing aid in anti-mycotic material) | 0.09 |
| Water (liquid medium for dispersing anti-mycotic) | 2.58 |

Three food samples are prepared, a control sample of shredded mozzarella cheese, a sample of shredded mozzarella cheese with 1%, by weight, of the food ingredient composition dispersed in the sample, and a sample of shredded mozzarella cheese with 2%, by weight, of the food ingredient composition dispersed in the sample. Each sample is divided into 24 parts, which are packaged in 24 bags of conventional cheese packaging material. The sample bags are then stored at 45° F. for the duration of the experiment. The bags are viewed visually at 30 days, 60 days, 120 days, 160 days, and 180 days to determine whether the sample in each bag is spoiled by mold, yeast, or fungal growth. The number of bags of a sample containing spoiled material is then expressed as a ratio of the total bags of that sample. The results are shown in Table 3 below.

TABLE 3

| | Number of Spoiled Sample Bags/Total Sample Bags | | |
|---|---|---|---|
| Storage Period | Control Sample | 1% Sample | 2% Sample |
| 30 days | 20/24 | 2/24 | 2/24 |
| 60 days | All | 15/24 | 9/24 |
| 120 days | All | 17/24 | 11/24 |
| 160 days | All | 19/24 | 12/24 |
| 180 days | All | 20/24 | 13/24 |

As shown in Table 3, the food ingredient composition is effective to reduce the amount of spoilage of a divided cheese material over an extended period of time, and a divided cheese material containing just 2% of the food ingredient composition, by weight, is particularly well protected against mold, fungus, and yeast growth over an extended period of time.

EXAMPLE 8

In an eighth experiment, the anti-mycotic efficacy of a food ingredient composition formed in accordance with the present invention is measured in a divided cheese material compared to a control having no additives, a sample having only an anti-caking material added thereto, and a sample having a direct action anti-mycotic applied directly to an anti-caking material added thereto.

A food ingredient composition is formed in the manner set forth in Example 1, except that the ingredients are included in the following percentages, by weight of the total ingredient composition.

| Ingredient | Percent, by weight (of total weight of ingredients) |
|---|---|
| Powdered cellulose (anti-caking material) | 96.24 |
| Lecithin (encapsulating agent) | 1.00 |
| Natamycin (anti-mycotic material) | 0.12 |
| Lactose (processing aid in anti-mycotic material) | 0.12 |
| Water (liquid medium for dispersing anti-mycotic) | 2.52 |

A direct application anti-mycotic/anti-caking combination material is formed by spraying the same amount of natamycin/lactose in water as used to form the food ingredient composition directly onto the same amount of powdered cellulose used to form the food ingredient composition, and mixing the materials together until the materials are homogeneously mixed.

One percent (1%), by weight of a cheese sample, of the food ingredient composition, the direct application combination material, and a pure cellulose anti-caking material are added to separate samples of shredded mozzarella cheese. The three resulting samples and a control sample of shredded mozzarella cheese are packaged in conventional shredded cheese packaging material, and are stored at 45° F. Mold and yeast counts are taken of the samples by standard laboratory agar plating prior to packaging, 15 days after storage, and 30 days after storage. The results are shown in Table 4 below.

TABLE 4

| Storage period | Control (no ingredients added) | 1% pure cellulose material | 1% direct application combination | 1% food ingredient composition |
|---|---|---|---|---|
| Day 0 | | | | |
| Yeast (cfu/g) | $7.0 \times 10^1$ | $3.5 \times 10^1$ | $4.3 \times 10^1$ | $3.0 \times 10^1$ |
| Mold (cfu/g) | Less than 10 | Less than 10 | Less than 10 | Less than 10 |
| Day 15 | | | | |
| Yeast (cfu/g) | $5.4 \times 10^6$ | $1.8 \times 10^6$ | $3.9 \times 10^4$ | Less than 10 |
| Mold (cfu/g) | $5.4 \times 10^3$ | $7.5 \times 10^1$ | Less than 10 | $2.0 \times 10^1$ |
| Day 30 | | | | |
| Yeast (cfu/g) | $8.6 \times 10^7$ | $3.7 \times 10^7$ | $2.9 \times 10^5$ | Less than 10 |
| Mold (cfu/g) | $1.8 \times 10^7$ | $2.3 \times 10^6$ | $3.8 \times 10^3$ | Less than 10 |

As shown in Table 4, the food ingredient composition of the present invention is more effective in inhibiting mold and yeast growth in a divided cheese material than: a combination material in which a direct action anti-mycotic material is applied directly to an anti-caking material; and a pure cellulose anti-caking material.

EXAMPLE 9

In a ninth experiment, the effectiveness of a food ingredient composition formed according to the present invention in inhibiting mold, yeast, and fungal growth in an oxygenated atmosphere is determined.

A food ingredient composition is formed according to the process set forth in Example 1, only with the relative amounts of materials set forth in Example 8. The food ingredient composition is added to two samples of shredded mozzarella cheese, where 0.75%, by weight of the first cheese sample, of the food ingredient composition is added to the first sample, and 1.5%, by weight of the second cheese sample, of the food ingredient composition is added to the second sample. Two further shredded mozzarella cheese samples are formed, one containing 0.75%, by weight of the cheese sample, of pure cellulose anti-caking material, and the other containing 1.5%, by weight of the cheese sample, of the cellulose material. A control sample containing only shredded mozzarella cheese is also provided.

Each sample is divided into two portions—one portion is packaged into four packages in a controlled 2% oxygen atmosphere, and the other portion is packaged into four packages in a controlled 5% oxygen atmosphere. The packaging material used package the samples has a high oxygen barrier film to prevent the escape of the oxygen from the packages.

The sample packages are stored for 30 days at 45° F. in a frequently used refrigerator to simulate food product abuse. After 14, 20, and 30 days, spoilage due to yeast, mold, or fungi is determined by visual examination. The percentage of packages spoiled by yeast, mold, or fungi is determined by the following formula: (Number of spoiled packages of sample/Number of total packages of sample)*100. The results are shown in Table 5 below.

TABLE 5

| Treatment | Percent Sample Spoiled | | |
|---|---|---|---|
| | 14 days | 20 days | 30 days |
| 2% oxygen samples | | | |
| Control-no added ingredients | 50 | 75 | 100 |
| 0.75% cellulose | 25 | 100 | 100 |
| 0.75% composition | 0 | 0 | 0 |
| 1.5% cellulose | 50 | 100 | 100 |
| 1.5% composition | 0 | 0 | 0 |
| 5% oxygen samples | | | |
| Control - no added ingredients | 50 | 100 | 100 |
| 0.75% cellulose | 25 | 100 | 100 |
| 0.75% composition | 0 | 0 | 0 |
| 1.5% cellulose | 100 | 100 | 100 |
| 1.5% composition | 0 | 0 | 0 |

As shown in Table 5, the food ingredient composition of the present invention has substantial anti-mycotic activity in a controlled oxygenated environment.

It is to be understood that the foregoing are merely preferred embodiments of the invention and that various changes and alterations can be made without departing from the spirit and broader aspects thereof as set forth in the appended claims, which are to be interpreted in accordance with the principles of patent law including the Doctrine of Equivalents.

What is claimed is:

1. A process for forming a food ingredient having anti-caking and anti-mycotic properties, comprising:
    providing a particulate anti-caking material;
    treating said anti-caking material with an encapsulating agent to at least partially encapsulate at least a portion of said anti-caking material with said encapsulating agent; and
    after treating said anti-caking material with said encapsulating agent, treating said anti-caking material with a direct action anti-mycotic material so that said anti-mycotic material is distributed on said encapsulating agent on said particles of said anti-caking material;
    where said anti-caking material is provided in an amount of from about 50% to about 99% by weight of the combined weight of said anti-caking material, said encapsulating agent, and said anti-mycotic material.

2. The process of claim 1 wherein said anti-caking material is selected from the group consisting of celluloses, including powdered cellulose and microcrystalline cellulose; silicates; starches; clays; minerals; flours; fibers; polysaccharides; carbohydrates; protein compounds; and any combination thereof.

3. The process of claim 1 wherein the step of treating said anti-caking material with an encapsulating agent comprises at least partially coating said anti-caking material with said encapsulating agent.

4. The process of claim 1 wherein the step of treating said anti-caking material with an encapsulating agent comprises mixing said anti-caking material with said encapsulating agent.

5. The process of claim 4 wherein said encapsulating agent is sprayed onto said anti-caking material to mix said encapsulating agent with said anti-caking material.

6. The process of claim 5 wherein said encapsulating agent is atomized as it is sprayed on said anti-caking material.

7. The process of claim 4 wherein said anti-caking material is agitated while being mixed with said encapsulating agent.

8. The process of claim 1 wherein said anti-caking material is agitated while being treated with said encapsulating agent.

9. The process of claim 1 wherein said encapsulating agent is selected from the group consisting of oils; lecithin; fats; emulsifiers; sugar alcohols; proteins; polyols; carbohydrate solutions; hydrocolloids; and mixtures thereof.

10. The process of claim 1 wherein said encapsulating agent comprises from about 0.1% to about 10% of the combined weight of said anti-caking material, said encapsulating agent, and said anti-mycotic material.

11. The process of claim 1 wherein the step of treating said encapsulated anti-caking material with said anti-mycotic material comprises mixing said encapsulated anti-caking material with said anti-mycotic material.

12. The process of claim 11 wherein said anti-mycotic material is contained in a liquid medium.

13. The process of claim 12 wherein said liquid medium containing said anti-mycotic material is sprayed on said encapsulated material to mix said anti-mycotic material with said anti-caking material.

14. The process of claim 13 wherein said liquid medium containing said anti-mycotic material is atomized as it is sprayed on said encapsulated anti-caking material.

15. The process of claim 13 wherein said liquid medium containing said anti-mycotic material is agitated while it is sprayed on said encapsulated anti-caking material.

16. The process of claim 1 wherein said anti-mycotic material is bound to the surface of said encapsulated anti-caking material upon treating said encapsulated anti-caking material with said anti-mycotic material.

17. The process of claim 1 wherein said direct action anti-mycotic material is natamycin.

18. A process for forming a food ingredient having anti-caking and anti-mycotic properties, comprising:
    providing a particulate anti-caking material;
    treating said particulate anti-caking material with an encapsulating agent containing a direct action anti-mycotic material so that said anti-mycotic material is distributed in said encapsulating agent on particles of said anti-caking material;
    where said anti-caking material is provided in an amount of from about 50% to about 99% by weight of the combined weight of said anti-caking material, said encapsulating agent, and said anti-mycotic material.

19. The process of claim 18 wherein said anti-caking material is selected from the group consisting of celluloses, including powdered cellulose and microcrystalline cellulose; silicates; starches; clays; minerals; flours; fibers; polysaccharides; carbohydrates; protein compounds; and mixtures thereof.

20. The process of claim 18 wherein said encapsulating agent is selected from the group consisting of oils; lecithin; fats; emulsifiers; sugar alcohols; proteins; polyols; carbohydrate solutions; hydrocolloids; and mixtures thereof.

21. The process of claim 18 wherein said encapsulating agent comprises from about 0.1% to about 10% of the combined weight of said anti-caking material, said encapsulating agent, and said anti-mycotic material.

22. The process of claim 18 wherein said anti-mycotic material is natamycin.

23. The process of claim 18 wherein said anti-mycotic material comprises from about 0.0001% to about 10% of the combined weight of said anti-caking material, said encapsulating agent, and said anti-mycotic material.

24. The process of claim 18 wherein said anti-mycotic agent is blended in said encapsulating agent prior to treating said anti-caking material with said encapsulating agent containing said anti-mycotic material.

25. The process of claim 18 wherein the step of treating said anti-caking agent with said encapsulating agent containing said anti-mycotic material comprises mixing said anti-caking material with said encapsulating agent containing said anti-mycotic material.

26. The process of claim 25 wherein said encapsulating agent containing said anti-mycotic material is sprayed on said anti-caking agent to mix said anti-caking material with said encapsulating agent and said anti-mycotic material.

27. The process of claim 26 wherein said encapsulating agent containing said anti-mycotic material is atomized as it is sprayed on said anti-caking material.

28. The process of claim 26 wherein said encapsulating agent containing said anti-mycotic material is agitated as it is sprayed on said anti-caking material.

29. The process of claim 18 wherein said anti-caking material is agitated as it is treated with said encapsulating agent containing said anti-mycotic material.

* * * * *